United States Patent
Adachi

(10) Patent No.: US 6,615,124 B1
(45) Date of Patent: Sep. 2, 2003

(54) VEHICULAR DYNAMIC CONTROLLING APPARATUS AND METHOD

(75) Inventor: Kazutaka Adachi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/540,889

(22) Filed: Mar. 31, 2000

(30) Foreign Application Priority Data

Apr. 2, 1999 (JP) ............................................. 11-096427

(51) Int. Cl.[7] .......................... G06F 19/00; G06G 7/00; B60T 8/24; B62D 5/06; B62D 5/04
(52) U.S. Cl. ............................. 701/70; 701/41; 701/43; 701/72; 701/78; 701/80; 303/140; 303/146; 180/410; 180/411; 180/445; 280/5.507
(58) Field of Search ............................... 701/36, 41, 72, 701/78, 43, 79, 80; 303/140, 146; 180/445, 410, 411; 280/5.507

(56) References Cited

U.S. PATENT DOCUMENTS

| | | | |
|---|---|---|---|
| 4,666,013 A | * 5/1987 | Shibahata et al. | 180/141 |
| 4,679,809 A | 7/1987 | Ito et al. | 280/91 |
| 4,949,261 A | * 8/1990 | Ito et al. | 701/41 |
| 5,201,382 A | * 4/1993 | Edahiro et al. | 180/197 |
| 5,337,850 A | 8/1994 | Mouri et al. | 180/140 |
| 5,402,341 A | * 3/1995 | Liubakka et al. | 701/42 |
| 5,428,532 A | * 6/1995 | Yasuno | 701/48 |
| 5,648,903 A | * 7/1997 | Liubakka | 701/41 |
| 5,700,073 A | * 12/1997 | Hiwatashi et al. | 303/146 |
| 5,754,966 A | * 5/1998 | Ichikawa et al. | 701/41 |
| 5,816,669 A | 10/1998 | Hiwatashi et al. | 303/140 |
| 6,015,192 A | 1/2000 | Fukumura | 303/140 |
| 6,125,319 A | * 9/2000 | Hac et al. | 303/150 |

FOREIGN PATENT DOCUMENTS

| | | |
|---|---|---|
| DE | 196 43 197 A1 | 4/1997 |
| JP | 3-4429 | 4/1986 |
| JP | 3-4428 | 1/1991 |
| JP | 5-105101 | 4/1993 |
| JP | 2000-95083 | 4/2000 |

* cited by examiner

Primary Examiner—Jacques H. Louis-Jacques
Assistant Examiner—Brian J Broadhead
(74) Attorney, Agent, or Firm—Foley & Lardner

(57) ABSTRACT

Vehicular dynamic controlling apparatus and method for an automotive vehicle which can achieve a desired yaw rate output in response to a steering input by a vehicular driver even when the controlled vehicle is running in such a cornering limit range such that a vehicular lateral acceleration is relatively large without giving a steering maneuver different from that the vehicular driver desires to the vehicular driver. The vehicular dynamic controlling apparatus includes: brake force distribution controlling section and brake pressure controlling section which control a brake force for each tire wheel of the controlled vehicle so as to eliminate a deviation between an estimated value of a (steady state) yaw rate gain $Y_G$ and a target value of the yaw rate gain $Y_{GT}$; and rear tire wheel angular displacement controlling section and rear tire steering angular displacement actuator which control a rear tire wheel steering angular displacement to make a rear tire wheel steering angular displacement command value $\delta_{RC}$ coincident with an actual rear tire wheel steering angular displacement $\delta_{RR}$. The rear tire steering angular displacement command value $\delta_{RC}$ is calculated from detected values of the vehicular velocity V (or v) and a steering angular displacement θ of a steering wheel, target vehicular dynamical variables, a tire performance information, and a previously measured controlled vehicular dynamic model.

16 Claims, 6 Drawing Sheets

FIG.3
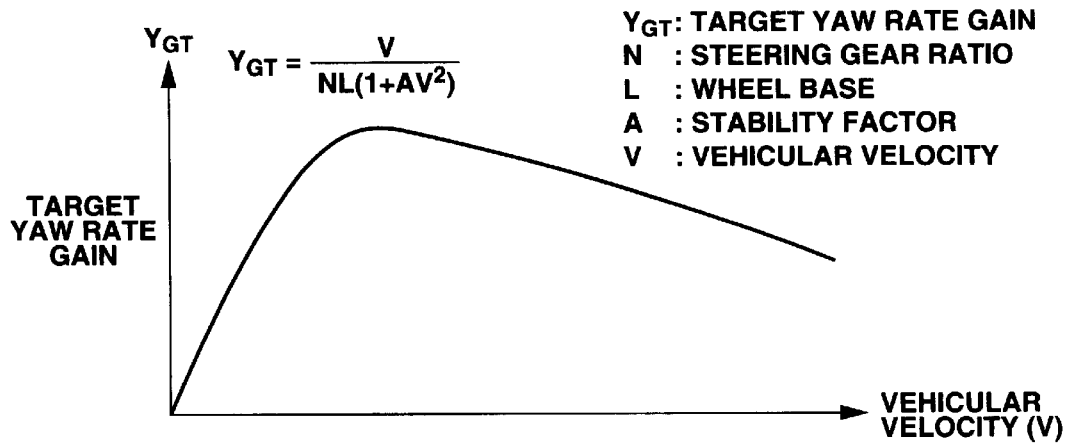
$$Y_{GT} = \frac{V}{NL(1+AV^2)}$$
$Y_{GT}$: TARGET YAW RATE GAIN
N : STEERING GEAR RATIO
L : WHEEL BASE
A : STABILITY FACTOR
V : VEHICULAR VELOCITY
TARGET YAW RATE GAIN
VEHICULAR VELOCITY (V)
CHARACTERISTICS OF THE FRONT STEER VEHICLE AT A HIGH μ ROAD SURFACE
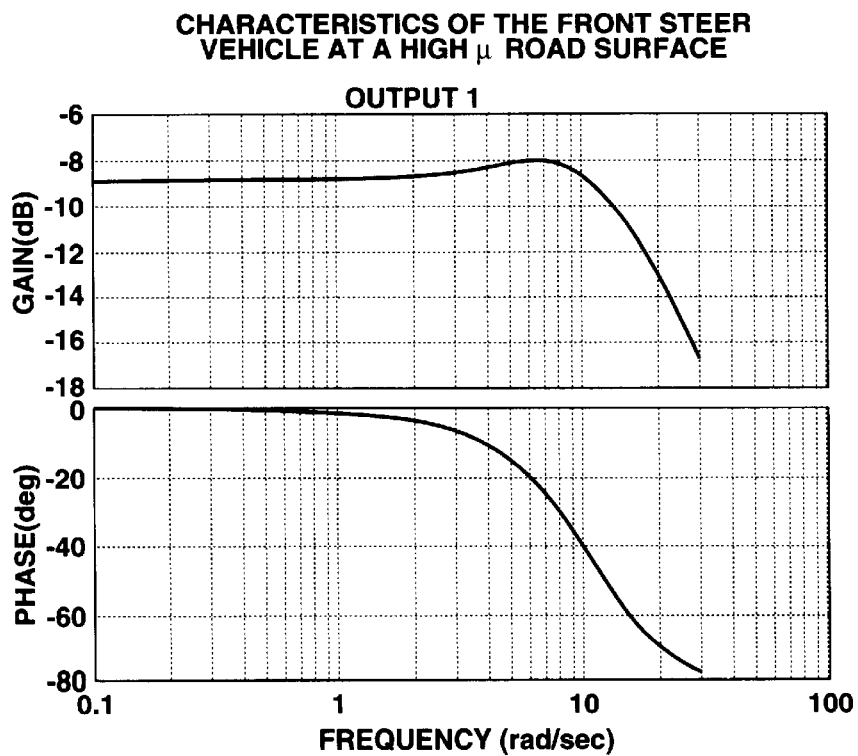
FIG.4A
FIG.4B

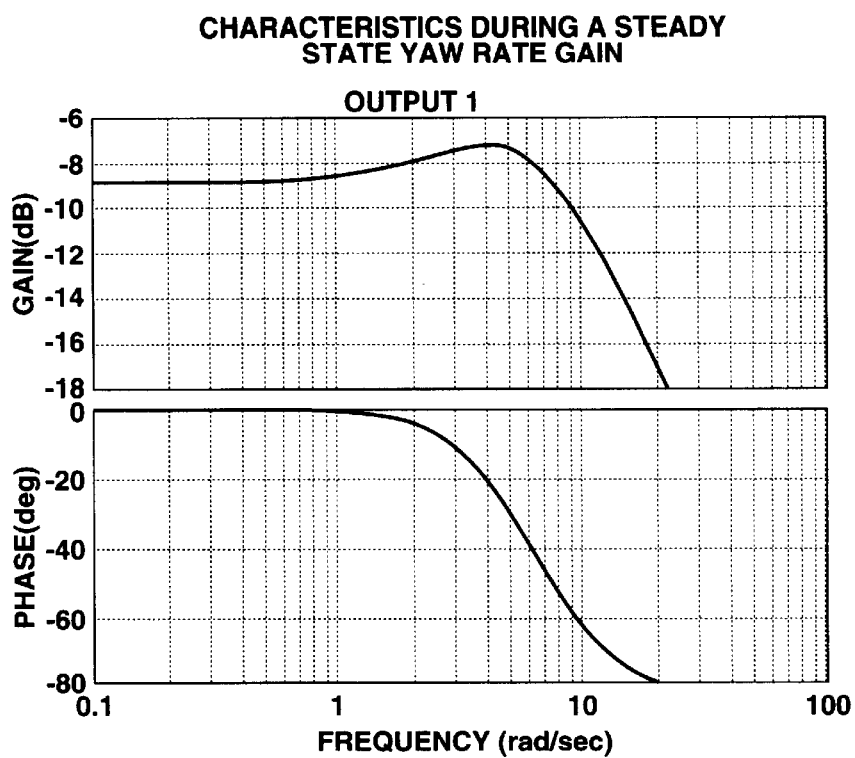

RESULTS OF STEERING RESPONSE SIMULATIONS

——— HIGH FRICTIONAL COEFFICIENT ROAD SURFACE (NORMAL RUNNING STATE)

------ LOW FRICTIONAL COEFFICIENT ROAD SURFACE STEADY STATE YAW RATE GAIN (BRAKE) CONTROL

RESULTS OF STEERING RESPONSE SIMULATIONS

- - - - - - - STEADY STATE YAW RATE GAIN (BRAKE) CONTROL
——————— STEADY STATE YAW RATE GAIN CONTROL + 4WS
(TARGET VEHICULAR MODEL MODIFIED)
— · — · — · STEADY STATE YAW RATE GAIN CONTROL + 4WS
(TARGET VEHICULAR MODEL AND CONTROLLED
VEHICULAR MODEL MODIFIED)

VEHICULAR DYNAMIC CONTROLLING APPARATUS AND METHOD

BACKGROUND OF THE INVENTION a) Field of the Invention

The present invention relates to a vehicular dynamic controlling apparatus and method for an automotive vehicle.

The present invention, particularly, relates to a vehicular dynamic control technique for a vehicular dynamic stability control block to perform a brake force distribution control for each of front or rear tire wheels and/or left or right tire wheels so as to make an estimated value of a yaw rate gain coincident with a target value of the yaw rate gain and a front-wheel steering control block to perform a control over a vehicular yaw rate and lateral motion on the basis of such a vehicular motion (or dynamic) information as a tire cornering force as a result of the brake force distribution control.

b) Description of the Related Art

A Japanese Patent Application First Publication No. Heisei 5-105101 published on Apr. 27, 1993 exemplifies a previously proposed four-wheel steering control apparatus in which a steering angular displacement of each of front and rear tire wheels is controlled so that an actual yaw rate is made coincident with a target yaw rate characteristic.

SUMMARY OF THE INVENTION

In the previously proposed four-wheel steering controlling apparatus and method, even when the vehicle is running in a cornering limit running range having a relatively large lateral acceleration of the vehicle, a steering angular displacement of front and rear road wheels are controlled so that the yaw rate generated on the vehicle is made coincident with the target yaw rate characteristic.

Therefore, since the target yaw rate characteristic is made coincident with the generated yaw rate irrespective of a magnitude of the steering angular displacement by the driver, there is a possibility of giving a steering maneuver different from that the vehicular driver desires to the driver.

In addition, there would be a little effect of reducing an understeer tendency by increasing a steering angular displacement of a steering wheel when the vehicle in which the above-described previously proposed control apparatus is mounted is running in the cornering limit running range.

Then, a previously proposed vehicular wheel brake controlling apparatus has been proposed in which a brake force distribution control has been adopted so that an estimated value of a steady state yaw rate gain is made coincident with a target value thereof, thus preventing a spin or drift out even in the cornering limit running range to achieve a desired yaw rate output in response to a steering input by the vehicular driver. The steering input indicates that the vehicular driver has steered a steering wheel of the vehicle.

It is noted that the previously proposed wheel brake controlling apparatus is described in a Japanese Patent Application No. Heisei 10-266542 filed in Japan on Sep. 21, 1998 and does not form a prior art (under 35 U.S.C. 102 and 35 U.S.C. 103).

In the other previously proposed vehicular wheel brake controlling apparatus, the brake distribution control is carried out to make the vehicular steady state yaw rate gain coincident with the target steady state yaw rate gain.

Hence, the tire cornering force in terms of a concept of a circle of friction so that a damping characteristic of the yaw rate becomes reduced as compared with a vehicular normal running condition.

As described above, since a steering maneuver characteristic (steering maneuverability) is varied when the vehicular dynamic stability control is carried out only through the brake force distribution control, there is also the possibility of producing the steering maneuver different from that the vehicular driver has desired to the driver.

It is, therefore, an object of the present invention to provide vehicular dynamic controlling apparatus and method which give a desired yaw rate output in response to the steering input of the vehicular driver even when the vehicle is running in the cornering limit running range without giving the steering maneuver different from that the driver has desired to the driver through a yaw rate damping characteristic which is generally the same as that of the vehicular normal running condition.

The above-described object can be achieved by providing a vehicular dynamic controlling apparatus comprising: a vehicular velocity sensor to detect a vehicular velocity; a steering angular displacement sensor to detect a steering angular displacement of a vehicular steering wheel; a yaw rate sensor to detect a vehicular yaw rate; a yaw rate gain estimating section that estimates a vehicular yaw rate gain from detected values of the vehicular velocity, the yaw rate, and the steering angular displacement; a target yaw rate gain setting section that sets a target value of the yaw rate gain; a brake force distribution controlling section that calculates a brake force command value for each of vehicular front left and right and rear left and right tire wheels to reduce a deviation between an estimated value of the yaw rate gain and the target value thereof; a brake pressure controlling section that controls a brake pressure to be applied to each tire wheel in accordance with the brake force command value for each tire wheel; a tire information calculating section that calculates a tire information related to a vehicular dynamic information on the basis of the brake force for each tire wheel and previously measured tire data; a rear tire wheel steering actuator to be enabled to actuate the rear tire wheels to be steered; a target vehicular dynamical variable calculating section that calculates target vehicular dynamical variables on the basis of the detected values of the vehicular velocity and the steering angular displacement and a target vehicular dynamic model; a rear tire wheel steering angular displacement command value calculating section that calculates a rear tire wheel steering angular displacement command value according to the detected values of the vehicular velocity and the steering angular displacement, the target vehicular dynamical variables, the tire information, and a previously measured controlled vehicular dynamic model; and a rear tire wheel steering angular displacement controlling section that controls an actuation of the rear tire wheel steering angular displacement actuator to make the rear tire wheel steering angular displacement command value coincident with an actual rear tire wheel steering angular displacement.

The above-described object can also be achieved by providing a vehicular dynamic controlling method comprising: detecting a vehicular velocity; detecting a steering angular displacement of a vehicular steering wheel; detecting a vehicular yaw rate; estimating a vehicular yaw rate gain from detected values of the vehicular velocity, the yaw rate, and the steering angular displacement; setting a target value of the yaw rate gain; calculating a brake force command value for each of vehicular front left and right and rear left and right tire wheels to reduce a deviation between an estimated value of the yaw rate gain and the target value thereof; controlling a brake pressure to be applied to each of the tire wheels in accordance with the brake force command value for each tire wheel; calculating a tire information related to a vehicular dynamic information on the basis of the brake force for each tire wheel and previously measured tire data; calculating target vehicular dynamical variables on the basis of the detected values of the vehicular velocity and the steering angular displacement and a target vehicular dynamic model; calculating a rear tire wheel steering angular displacement command value according to the detected values of the vehicular velocity and the steering angular displacement, the target vehicular dynamical variables, the tire information, and a previously measured controlled vehicular dynamic model; and controlling an actuation of a rear tire wheel steering angular displacement actuator to make the rear tire wheel steering angular displacement command value coincident with an actual rear tire wheel steering angular displacement.

BRIEF DESCRIPTION OF THE DRAWINGS

FIG. 3 is a characteristic graph representing a relationship between a target value of a steady state yaw rate gain and an estimated value of the steady state yaw rate gain.

FIGS. 4A and 4B are characteristic graphs representing results of simulations on frequency response characteristics of gain and phase of a yaw rate when a front wheel steered vehicle in which the vehicular dynamic controlling apparatus in the preferred embodiment shown in FIG. 1 is mounted with no execution of a brake force distribution control was running on a low frictional road surface.

FIGS. 5A and 5B are characteristic graphs representing the results of simulations on frequency response characteristics on phase and gain of the yaw rate when the vehicle in which the vehicular dynamic controlling apparatus in the preferred embodiment shown in FIG. 1 is mounted with a steady state yaw rate gain brake control was running under a low frictional coefficient road surface.

DETAILED DESCRIPTION OF THE PREFERRED EMBODIMENT

Reference will hereinafter be made to the drawings in order to facilitate a better understanding of the present invention.

Figure 1:
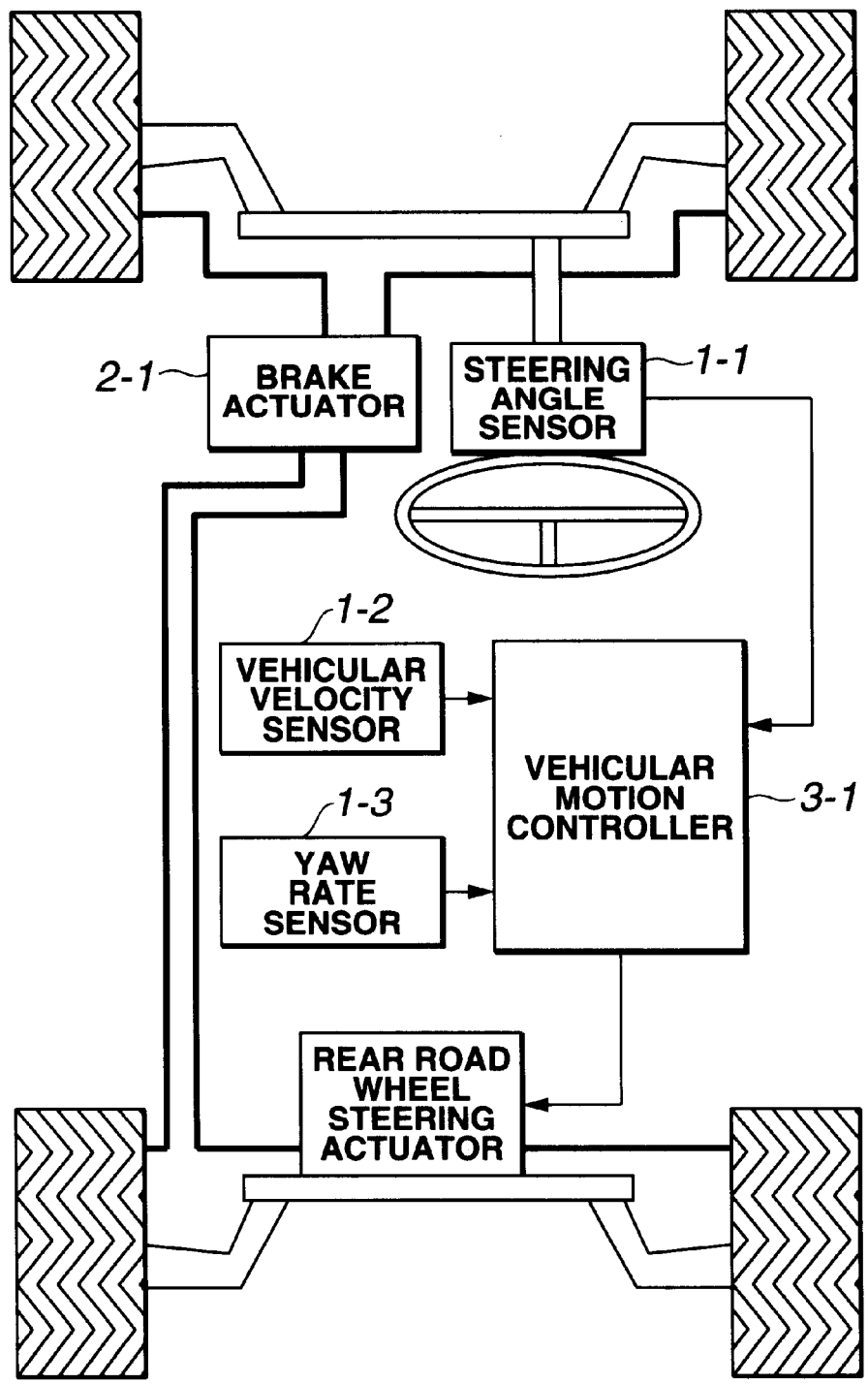
FIG. 1 is a schematic block diagram of a vehicular dynamic controlling apparatus in a preferred embodiment according to the present invention.

FIG. 1 shows a whole system configuration of a vehicular dynamic controlling apparatus in a preferred embodiment according to the present invention.

In FIG. 1, 1-1 denotes a steering angle sensor (also called, a steering angular displacement sensor) which outputs a pulse signal whenever a vehicular driver steers a steering wheel of the vehicle through a predetermined steering angular displacement, 1-2 denotes a vehicular velocity sensor which detects a vehicular velocity, 1-3 denotes a yaw rate sensor which detects a yaw rate (yaw angular velocity) of the vehicle (vehicular body), 2-1 denotes a brake actuator, 2-2 denotes a rear tire wheel steering actuator to be enabled to actuate rear tire wheels to be steered, and 3-1 denotes a vehicular motion (dynamic) controller.

The vehicular dynamic controller 31 includes a microcomputer normally having a CPU (Central Processing Unit), a ROM (Read Only Memory), a RAM (Random Access Memory), I/O Ports, and a common bus, in terms of hardware.

Figure 2:
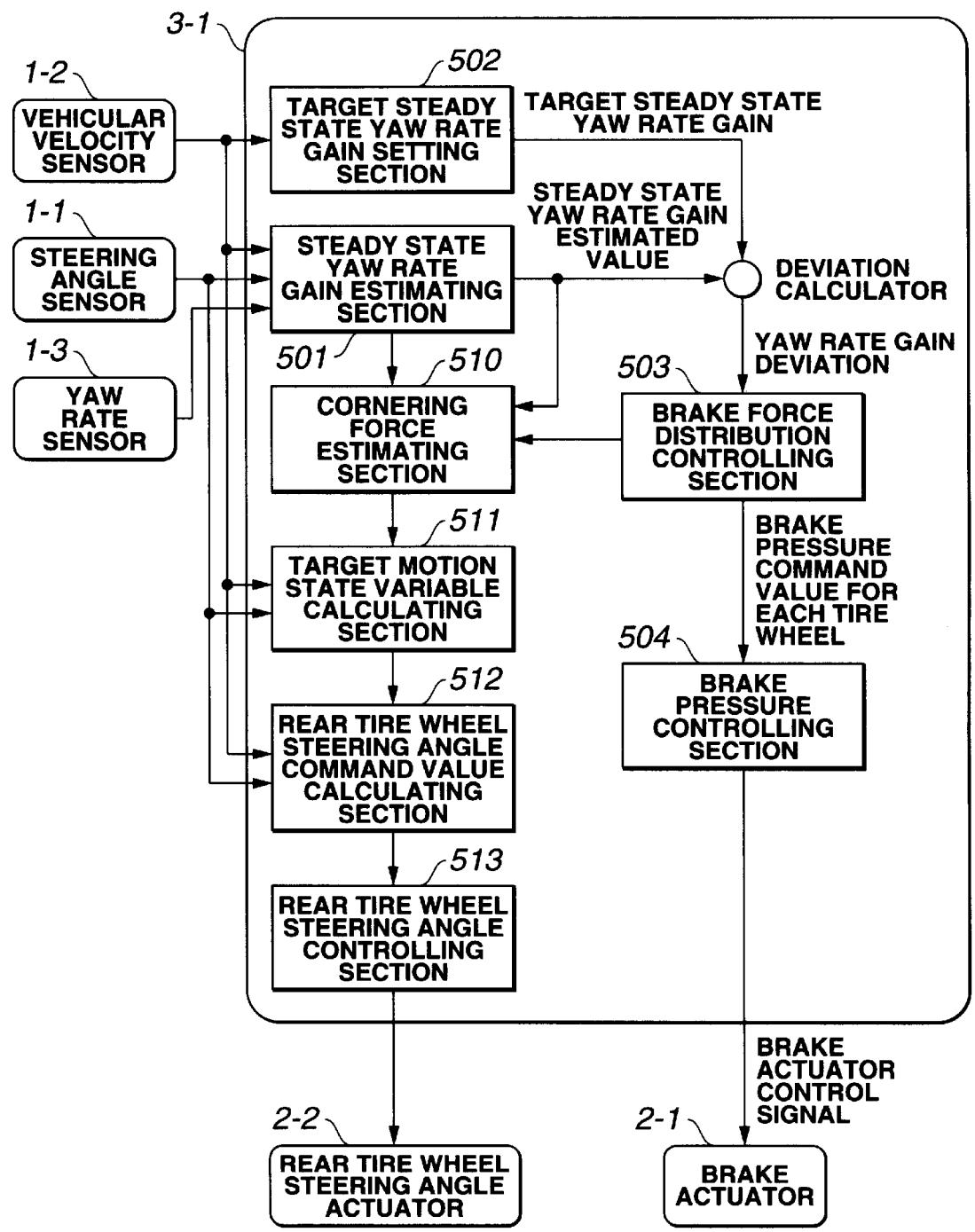
FIG. 2 is a schematic functional block diagram characteristic graph in a vehicular motion (dynamic) controller shown in FIG. 1.
Figures 6A, 6B, 6C, 6D:
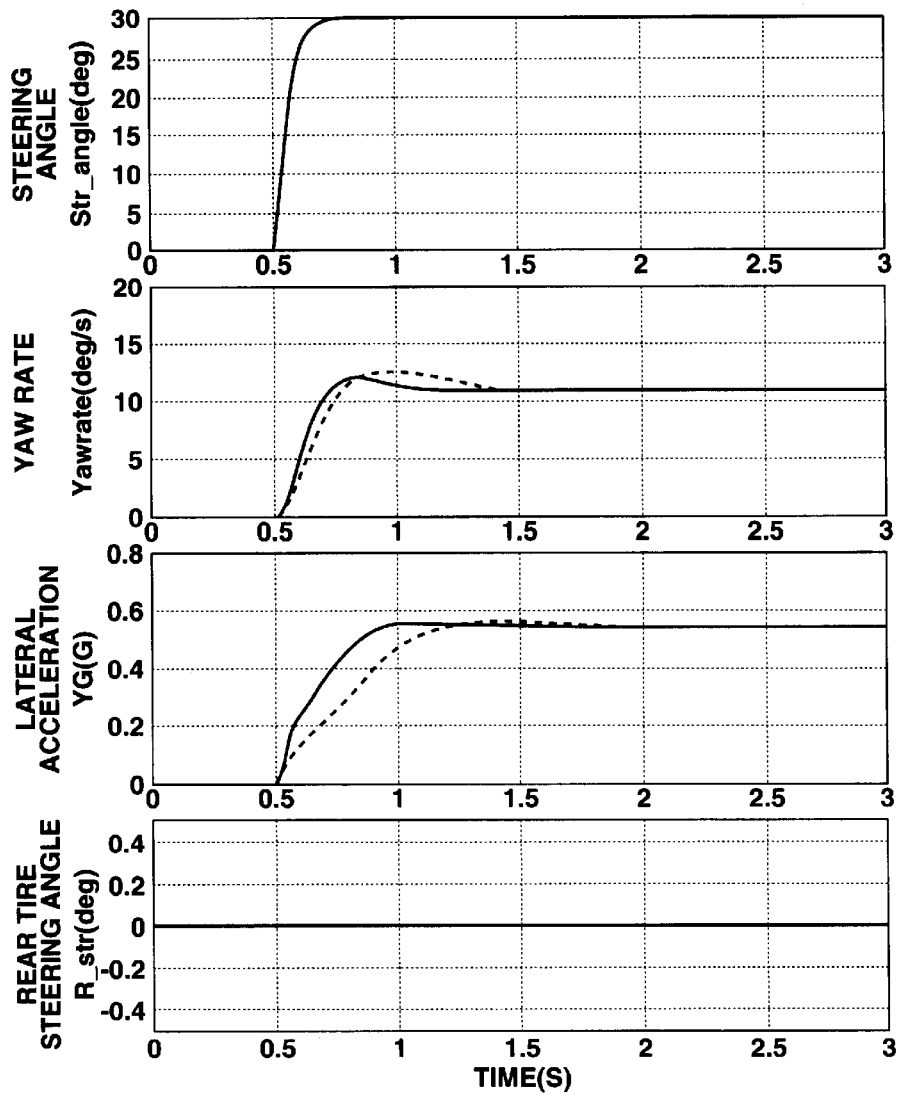
FIGS. 6A, 6B, 6C, and 6D are comparable characteristic graphs representing the results of simulations on steering input response characteristics when the vehicle in which the vehicular dynamic controlling apparatus in the preferred embodiment is mounted was running in a normal vehicular running state under a high frictional coefficient road surface and under a low frictional coefficient road surface with the execution of the steady state yaw rate gain brake control.

FIG. 2 shows a functional block diagram of the vehicular dynamic controlling apparatus shown in FIG. 1.

The steering angle sensor 1-1 detects a steering angular displacement of the steering wheel, the vehicular velocity sensor 1-2 detects the vehicular velocity of the vehicle with respect to a rear surface on which the vehicle runs, the yaw rate sensor 1-3 denotes the yaw rate of the vehicle, the brake actuator 2-1 applies a brake pressure to each or any one or two of front left and right and rear left and right tire wheels in accordance with a brake actuator control signal outputted from the vehicular motion controller 3-1. The rear tire wheel steering actuator 2-2 gives a rear tire steering angular displacement to the rear left and right tire wheels in accordance with a rear tire wheel steering actuator control signal from the vehicular motion controller 3-1.

The vehicular dynamic (motion) controller 3-1 receives sensor output signals from each sensor 1-1, 1-2, and 1-3 and outputs the above-described control signals to the brake actuator 2-1 and the rear tire wheel steering actuator 2-2.

In the vehicular motion controller 3-1 shown in FIG. 2, a steady state yaw rate gain estimating section 501 estimates a yaw rate gain in a steady state (steady state yaw rate gain) of the vehicle from detected values of the vehicular velocity sensor 1-2, the yaw rate from the yaw rate sensor 1-3, and the steering angle from the steering angle sensor 1-1. The estimation of the steady state yaw rate $Y_G$ by the steady state yaw rate gain will be described later.

A target steady state yaw rate gain setting section 502 sets a target steady state yaw rate gain $Y_{GT}$ in accordance with the detected value of the vehicular velocity of the vehicular velocity sensor 1-3.

A brake force distribution controlling section 503 calculates a brake force command value for each tire wheel (each tire wheel is defined as each or any two of the front left and right and rear left and right tire wheels) to eliminate a deviation between an estimated value $Y_G$ of the steady state yaw rate gain and a target value $Y_G$ of the steady state yaw rate gain.

A brake pressure controlling section 504 outputs a brake actuator control signal to the brake actuator 2-1 to make an actual brake pressure coincident with the brake pressure command value.

A cornering force estimating section (a tire information calculating section) 510 estimates front and rear tire cornering powers $HeK_f$ and $HK_R$ and front and rear maximum cornering forces $G_{FMAX}$ and $G_{RMAX}$ from the vehicular velocity, the steering wheel angle, the yaw rate, the brake force command value, previously measured tire (performance) data, and so forth.

A target dynamical variable calculating section 511 sets respective constants to calculate target values of a four-wheel steering control from the vehicular velocity v, the steering wheel steering angular displacement θ, the estimated values of the cornering powers and maximum cornering forces (an estimated value of a steady state yaw rate gain), then calculates target dynamical variables (also called, motion state variables) from the constants of a target vehicular dynamic model, and the detected values of the vehicular velocity and steering angular displacement (including a steering angular velocity).

A rear tire wheel steering angular displacement command value calculating section 512 calculates a rear tire wheel steering angular displacement command value $\delta_{RC}$ from the target dynamical variables, the estimated values of the front and rear tire wheel maximum cornering forces, and a previously measured controlled vehicular dynamic model. The controlled vehicle is an actual vehicle in which the dynamic controlling apparatus is mounted.

A rear tire wheel steering controlling section 513 outputs a control signal to the rear tire wheel steering angular displacement actuator 2-2 to make an actual rear tire wheel steering angular displacement $\delta_{RR}$ coincident with the rear tire wheel steering angular displacement command value $\delta_{RC}$.

Next, an operation of each section in the vehicular motion (dynamic) controller 3-1 will be described below.

Steady State Yaw Rate Gain Estimation

An estimating method for the steady state yaw rate gain at the steady state yaw rate gain estimating section 501 will be described below.

In the preferred embodiment, each parameter on a yaw rate output transfer characteristic in response to a steering input (the vehicular driver has steered the steering wheel) is calculated using a weighted least square method to derive the steady state yaw rate gain $Y_G$. The yaw rate output transfer characteristic in response to the steering input is in a form of first order/second-order using two degrees of freedom on yawing and lateral directions.

A plane motion constituted by a vehicular yawing direction and a lateral direction can be represented in linearized forms as equations (1) and (2) when a dynamic characteristic of a front tire wheel steering mechanism, a rolling motion, and the dynamic characteristic of the tires are neglected. That is to say, the equations (1) and (2) shown in Table 1 take the linearization forms.

Suppose that a state vector of the plane motion of the vehicle is x(t), an input (vector) is a steering angular displacement angle θ (t), and the rear tire wheel steering angular displacement is δ R. The plane motion can be defined in equations (3) and (4) shown in Table 1.

At this time, the equations (3) and (4) can be represented in state equations (5) shown in table 1.

In the equations from (1) to (5), ψ denotes the yaw rate, V y denotes a lateral velocity, M denotes a vehicular mass, V denotes the vehicular velocity, Iz denotes a yaw inertia moment, $L_F$ denotes a distance from the vehicular front wheel axle to a center of gravity of the vehicle, $L_R$ denotes a distance from the vehicular rear wheel axle to the center of gravity, $eK_F$ denotes a front tire wheel equivalent cornering power, $K_R$ denotes a rear tire wheel cornering power, $C_F$ denotes a front tire cornering force, $C_R$ denotes a rear tire wheel cornering force, θs denotes the steering angular displacement of the steering wheel, $\delta_R$ denotes the rear tire wheel steering angular displacement, and N denotes a steering gear ratio.

If the yaw rate is selected as the output, an output equation can be derived in an equation (6) in Table 2.

An input-and-output relationship in the equations (5) and (6) can be expressed in an equation (7) shown in Table 2 using a differential operator s (s=d/dt).

Suppose herein that a stable polynominal F(s) of a second order is introduced as in an equation (8) shown in Table 2.

Using the equation (8), the equation (7) can be rewritten as in an equation (9) shown in Table 2.

If the equation (9) is rearranged, an equation (10) shown in Table 2 can be given.

The equation (10) in Table 2 can further be expressed equivalently as in an equation (11) shown in Table 3.

As described above, a system's representation is a continuous time format which facilitates the relationship to physical quantities. However, a parameter's adjustment rule is used in a discrete time system having a favorable convergence characteristic. An identifier expressed in an equation (12) in Table 3 is set to correspond to the equation (11) shown in Table 3.

If a sampling time interval is denoted by ΔT, the equations (11) and (12) can be expressed as equations (13) and (14) shown in Table 4 at each time point t=kΔT (k=0, 1, 2, - - -).

As an identification rule, a weighted least square method is used as in equations (15), (16), and (17) shown in Table 3. To simplify the equations (15), (16), and (17) in the case of the preferred embodiment, β(k)=1 and δ=1.

Using the above-described equations, each parameter θT of the yaw rate transfer characteristic can be determined.

That is to say, the above equations (1) and (2) shown in Table 1 are in the linearization form.

Since the yaw rate gain $Y_G$ has an output relationship of the yaw rate in response to the steering input θS, the equation (7) can be rearranged to be enabled to be represented in an equation (18) shown in Table 4.

At this time, the parameter identification calculations described after the equation (7) can omit parts related to the rear tire steering angular displacement $\delta_R$ and can simplify the calculations more easily. The parameters to be derived are expressed in an equation (19) shown in Table 4.

Since the yaw rate gain has a relationship of the yaw rate output to the steering output θs, the equation (7) can be modified in the equation (18) shown in Table 4.

Consequently, the steady state yaw rate gain is expressed in an equation (20) shown in Table 4.

If the calculation in the equation (20) is carried out for each sampling time kΔT, the yaw rate gain can be estimated on a real time basis. Each parameter is in a form which is difficult (susceptible) to receive an influence from a change in the vehicular velocity v (or V) (since the vehicular velocity V is introduced in a positive manner).

Target Steady State Yaw Rate Gain Setting

The target steady state yaw rate gain setting section 502 sets the target steady state yaw rate gain $y_{GT}$ in accordance with the vehicular velocity v, shown in FIG. 3, so that a stability factor A of the vehicle remains constant. The target steady state yaw rate gain is expressed in the equation: $Y_{GT}=V/\{NL(1+AV^2)\}$.

Brake Force Distribution Control

The brake force distribution controlling section 503 performs the brake force control to make a balance between the front and rear tire cornering forces $C_F$ and $C_R$ due to the distribution between the front and rear brake forces to reduce the deviation between the target value of the steady state yaw rate gain $Y_{GT}$ and the estimated value of the yaw rate gain $Y_G$.

In the preferred embodiment, the brake force is determined by means of a PI (Proportional-Integration) control.

The brake force command value Brkcom is a multiplication of an integration value ErrI of the deviation, the deviation variable ErrP, and proportional and integration gains BrkI and BrkP. That is to say, Brkcom=ErrI×BrkI+ErrP×BrkP.

A case where Brkcom>0 indicates a case where the actual yaw rate gain is smaller than the target yaw rate gain and continues to be smaller than the target yaw rate gain (an understeer tendency). Hence, the brake force distribution controlling section 503 outputs the brake force command value to the brake pressure controlling section 504 to apply the brake to the rear tire wheels. This is because the application of the brake to the rear tire wheels causes the rear tire wheel cornering force $C_R$ to be decreased so that the front tire cornering force $C_F$ is relatively increased to suppress the understeer.

A case wherein Brkcom<0 indicates a case where the actual yaw gain is greater than the target yaw rate gain and continues to be greater than the target yaw rate gain (an oversteer tendency). Hence, the brake force distribution controlling section 503 outputs the brake force command value to the brake pressure controlling section 504 to apply the brake to the front tire wheels. This is because the application of the brake to the rear tire wheels causes the front tire wheel cornering force $C_F$ to be decreased so that the rear tire cornering force $C_R$ is relatively increased to suppress the oversteer.

Brake Pressure Control

The brake pressure controlling section 504 is constituted by a brake liquid pressure servo system and outputs the brake actuator control signal to the brake actuator 2-1 to make a brake pressure of each tire wheel coincident with its command value.

Estimation Of Cornering Force

The cornering force estimating section 510 compares the detected value of the steady state yaw rate gain with a previously measured steady state yaw rate gain under the road surface condition of the high frictional coefficient $\mu_H$ to determine cornering powers $HeK_f$ and $HK_R$ on the front and rear tires.

Maximum cornering forces $C_{FMAX}$ and $C_{RMAX}$ that the front and rear tires can output respectively and that are determined according to brake/driving forces are calculated using a map on tire (performance) data, a circle of friction (or a predetermined elliptical equation), and the brake force data in the brake pressure controlling section 504 or driving force data in an engine output controller (not shown).

During the calculation of the maximum cornering forces $C_{FMAX}$ or $C_{RMAX}$, the road surface frictional coefficient $\mu_H$ estimated from the brake force or the driving force, and the longitudinal acceleration is used. It is noted that an estimation method of the road surface frictional coefficient $\mu_H$ is also exemplified by a U.S. Pat. No. 6,015,192 issued on Jan. 18, 2000(, the disclosure of which is herein incorporated by reference).

A method of calculating the maximum cornering forces $C_{FMAX}$ or $C_{RMAX}$ of the front and rear tires is described in an equation (21) shown in Table 4.

In the equation (21), gmax denotes the longitudinal acceleration that a single tire can generate when the road surface frictional coefficient indicates 1, $\mu_H$ denotes the estimated road surface frictional coefficient, $M_F$ (or $M_R$) denotes a front (or rear) tire wheel load, $f_{Ty}$ denotes the brake force or the driving force, and $\gamma_y$ denotes a ratio of a maximum lateral force with respect to a maximum longitudinal force that the single tire can generate.

Target Dynamical variable Calculation

The target dynamical variable calculating section 511 calculates the target dynamical variable on the basis of the detected value of the steering angular displacement θ, the detected value of the vehicular velocity v (or V), and a previously set target vehicular model.

It is noted that a four-wheel steering angular displacement controlling apparatus is exemplified by a Japanese Patent Application Second (Examined) Publication No. Heisei 3-4429 published on Jan. 23, 1991, by a U.S. Pat. No. 5,337,850 issued on Aug. 16, 1994, or by a U.S. Pat. No. 4,679,809 issued on Jul. 14, 1987. The disclosures of the above-identified United States Patent are herein incorporated by reference. Especially, the U.S. Pat. No. 4,679,809 discloses the target vehicular dynamic model and a controlled vehicular dynamic model.

In this embodiment, the target dynamical variables are yaw angular acceleration ddψM and yaw angular velocity dψM.

In equations (22), (23), (24), and (25) of Table 5, $I_{ZM}$ denotes a yaw inertia moment of the target vehicular model, $M_M$ denotes a mass of a target vehicular model, $L_{FM}$ denotes a distance from the front tire wheel axle of the target vehicular dynamic model to the center of gravity, $L_{RM}$ denotes a distance from the rear tire wheel axle of the target vehicular dynamic model to the center of gravity, and $eK_{FM}$ denotes the front tire wheel cornering force.

Rear Tire Steering Wheel Command Value Calculation

The rear tire wheel steering angle command value calculating section 512 calculates the rear tire wheel steering angle command value $\delta_{RC}$ from the target yaw angular acceleration ddψM, and a previously measured controlled vehicular dynamic model using equations (26), (27), (28), (29), and (30) shown in Table 5.

In these equations, the previously calculated maximum cornering forces causes the calculated value of the cornering forces $C_{FS}$ and $C_{RS}$ of the controlled vehicular dynamic model to be limited. That is to say, a limiter is provided for each of the calculated cornering forces $C_{FS}$ and $C_{RS}$ as follows: if $C_{FS}<C_{FMAX}$, $C_{FS}=C_{FMAX}$, if $C_{rs}\geq C_{RMAX}$, $C_{FS}=C_{FS}$ and if $C_{RS}>C_{RMAX}$, $C_{RS}=C_{RMAX}$.

Rear Tire Wheel Steering Angle Control

The rear tire wheel steering angle controlling section 513 controls the rear tire wheel steering actuator 2-2 so that the rear tire wheel steering angle command value $\delta_{RC}$ is made coincident with the actual rear tire wheel steering angle $\delta_{RR}$ through a predetermined transfer function.

Next, when the above-described series of functions in the vehicular motion dynamic controller 3-1 are performed, the brake force and the variation in the road surface frictional coefficient are reflected on the four-wheel steering control system. Thus, the performance of the vehicular plane motion is improved as compared with the vehicle in which only the brake force distribution control is carried out as disclosed in the Japanese Patent Application No. Heisei 10-266542 (filed in Japan on Sep. 21, 1998).

FIGS. 4A and 4B show results of simulations on the frequency response characteristics on gain and phase of the yaw rate when a front wheel steered vehicle was running on a high frictional coefficient road surface with no brake force distribution control in the vehicular dynamic controlling apparatus in the preferred embodiment is carried out.

FIGS. 5A and 5B show simulation results on the frequency response characteristics on gain and phase of the yaw rate when the vehicle in which the vehicular dynamic controlling apparatus in the preferred embodiment was mounted was running on the low frictional coefficient road surface with the execution of a steady state yaw rate gain brake force control.

FIGS. 6A, 6B, 6C, and 6D show results of simulations when the vehicle in which the vehicular dynamic controlling apparatus in the preferred embodiment is mounted was running on the relatively high frictional coefficient road surface under the vehicular normal running condition and was running on the relatively low frictional coefficient road surface under the steady state yaw rate gain brake force control state.

FIGS. 7A, 7B, 7C, and 7D show results of simulations when the vehicle in which the vehicular dynamic controlling apparatus in the preferred embodiment is mounted was running only under the steady state yaw rate gain brake force control state and was running under both of the steady state yaw rate gain brake force control state and a yaw rate damping characteristic control plus the four wheel steering control (so-called, 4WS).

As appreciated from yaw rate gain and phase characteristics in FIGS. 4A, 4B, 5A, and 5B, when compared with each other, a steering frequency (a steering angular velocity and a lateral axis of each of FIGS. 4A through 5B) becomes increased (in a delay direction) and the steering frequency at which the yaw rate gain is abruptly reduced is reduced, the phase of the yaw rate gain becomes decreased when the steady state yaw rate gain is controlled only using the tire wheel brake force control (the steady state yaw rate gain control is carried out).

When compared with steering response simulation results in FIGS. 6A through 6D, it can be confirmed that the controlled vehicle only under the steady state yaw rate gain brake control provide an unfavorable damping characteristic as compared with the case of the vehicular dynamic characteristic where the vehicle was running on the relatively high frictional coefficient road surface under the normal running condition (denoted by a solid line in FIGS. 6A through 6D).

Figure 7A:
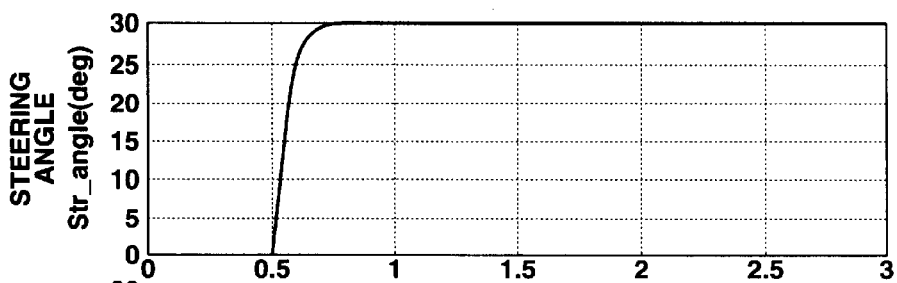
FIGS. 7A, 7B, 7C, and 7D are comparable characteristic graphs representing the results of simulations on the steering input response characteristics when the vehicle in which the vehicular dynamic controlling apparatus in the preferred embodiment is mounted was running with only the execution of the steady state yaw rate gain brake control, with executions of both of the steady state yaw rate gain brake control and a yaw rate damping characteristic control by means of a four wheel steering control system.
Figure 7B:
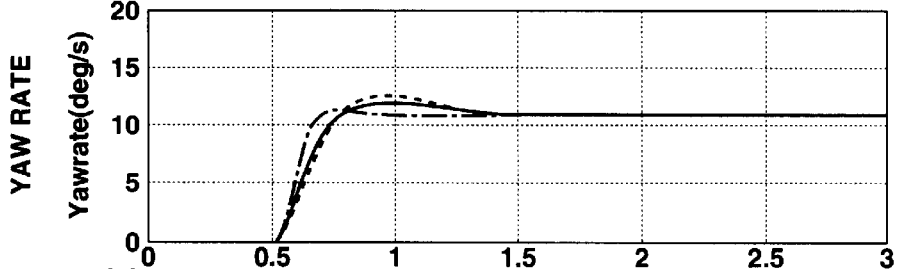
Figure 7C:
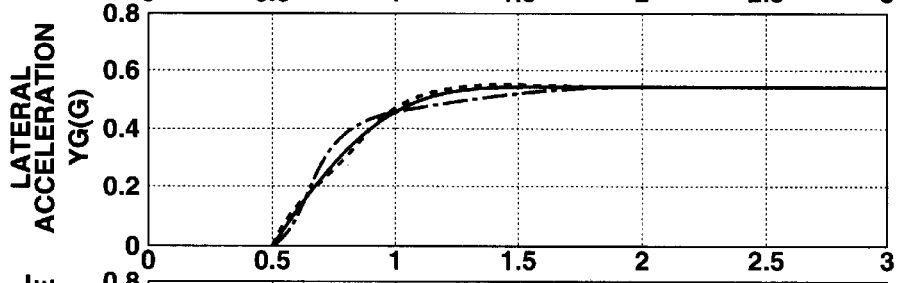
Figure 7D:
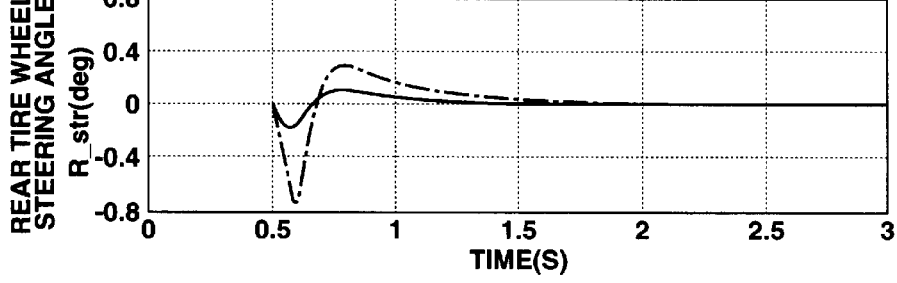

Next, in FIGS. 7A through 7D, the solid line in each of FIGS. 7C and 7D denotes each steering response characteristic on the vehicle in which the four wheel steering control system (4WS) is mounted together with the steady state yaw rate gain control and the target vehicular model is appropriately modified according to each tire condition of the controlled vehicle, a dot-and-dash line in each of FIGS. 7B, 7C, and 7D denotes corresponding steering response characteristics on the vehicle in which the four wheel steering control system is mounted together with the steady state yaw rate gain brake force control system and both of the target vehicular model and the controlled vehicular dynamic model are approximately modified, and the broken line in each of FIGS. 7B and 7D denotes the steering response characteristic on the vehicle in which only the steady state yaw rate gain brake force control is carried out.

As appreciated from FIGS. 7A through 7D, it can be confirmed that the vehicular dynamic controlling apparatus according to the present invention in which the damping characteristic control through the four wheel steering control system is mounted together with the steady state yaw rate gain brake force control can improve a convergence characteristic of each of the yaw rate YAWRATE and the lateral acceleration $Y_G$ as compared with the case of only the steady state-yaw rate gain brake force control and can improve the response characteristic even though the convergence characteristic is generally the same.

The vehicular dynamic controlling apparatus in which the yaw rate damping characteristic control through the four wheel steering control system is added to the steady state yaw rate gain brake force control has solved the problem caused by the installation of only the steady state yaw rate gain brake control. Specifically, the yaw rate damping characteristic control which is generally the same as the case when the vehicle is running under the normal running condition does not give a steering maneuver which is different from that the driver desires.

The vehicular dynamic controlling apparatus according to the present invention provides the desired yaw output in response to the steering input even when the vehicle is running under the cornering limit running range such that the vehicular lateral acceleration is relatively large.

Alternatives

In the preferred embodiment, the brake force distribution controlling section 503 is operated so that the brake force is controllably distributed to one of the front left and right tire wheels or one of the rear left and right tire wheels (so-called, front-or-rear tire wheel brake force distribution control). However, the brake force distribution controlling section 503 may be operated so that the brake force is controllably distributed to one of the front and rear left tire wheels or the front and rear right tire wheels (so-called, left-or-right tire wheel brake force distribution control). In addition, the brake force distribution controlling section 503 may be operated so that the brake force is controllably distributed in a combination of the front-or-rear tire wheel brake force distribution control and the left-or-right tire wheel brake force distribution control.

Furthermore, the brake force distribution controlling section 503 may be operated so that the brake pressure is controlled for each of all of the tire wheels (each of the front left and right tire wheels and the rear left and right tire wheels) in such a manner as to control the brake pressure for each tire wheel such as an inner wheel at a front tire wheel side and an outer wheel at a rear tire wheel side according to a vehicular running situation.

In a case where the brake force distribution control mode for the left-sided tire wheels or the right-sided tire wheels is carried out and the understeer tendency occurs, the brake is applied to the inner wheels with respect to a vehicular cornering direction to develop an inward moment so as to suppress the understeer tendency. In addition, in the other case where the oversteer tendency occurs, the brake is applied to the outer wheels with respect to a vehicular cornering direction to develop an outward moment so as to suppress the oversteer tendency. In a case where the brake force distribution control mode for the left-sided tire wheels, the right-sided tire wheels, the front-sided tire wheels, or the rear-sided tire wheels is carried out, the brake force distribution control according to the combination of the front-or-rear tire wheel brake force distribution control and the left-or-right tire wheel brake force distribution control is carried out. That is to say, in a case where either the understeer tendency or the oversteer tendency is relatively small (an absolute value of the deviation between the target value of the yaw rate gain $Y_{GT}$ and the estimated value of the yaw rate gain $Y_G$ is relatively small), the brake force distribution control for the front-or-rear tire brake control distribution is carried out. In another case where the understeer tendency or the oversteer tendency is large (the absolute value of the deviation described above is large), the left-or-right tire brake control distribution is carried out.

In the case where the brake pressure control for each of all tire wheels is carried out, smoother and greatly advantageous controls can be achieved as compared with the case of either front-or-rear tire wheel brake distribution control or the left-or-right tire wheel brake force distribution control.

Next, in the vehicular dynamic controlling apparatus in the preferred embodiment ace according to the present invention, the target yaw rate gain setting section 502 sets the target yaw rate gain in accordance with the vehicular velocity V so that the vehicular stability factor A remains constant. However, the target yaw rate gain $Y_{GT}$ may be set in accordance with the lateral acceleration.

Furthermore, the target yaw rate gain $Y_{GT}$ may be set in accordance with a stability factor characteristic that meets a taste of the vehicular driver.

Although the invention has been described above by reference to certain embodiments of the invention, the invention is not limited to the embodiments described above. Modifications and variations of the embodiments described above will occur to those skilled in the art in the light of the above teachings. The scope of the invention is defined with reference to the following claims.

TABLE 1

$$I_x \ddot{\phi} = 2_F C_F - 2L_R R_r \quad (1)$$

$$M\dot{V}_y = MV\dot{\phi} + 2C_F + 2C_R \quad (2)$$

Wherein, $$C_F = eK_F\{\theta_S/N - (V_y + L_F\dot{\phi})/V\}; \text{ and}$$

$$C_F = K_R\{\delta_R - (V_y + L_R\dot{\phi})/V\};$$

$$x^T = [\dot{\phi} \quad V_y] \quad (3)$$

$$u^T = [\theta_S \quad \delta_R] \quad (4)$$

$$\dot{X} = AX + Bu \quad (5)$$

Wherein, $$A = \begin{bmatrix} 2a_{11}/V & 2a_{12}/V \\ 2a_{21}/V - V & 2a_{22}/V \end{bmatrix}, B = \begin{bmatrix} 2b_{11}/N & 2b_{12} \\ 2b_{21}/N & 2b_{22} \end{bmatrix}$$

$a_{11} = -(L_F^2 eK_F + L_R^2 K_R)/I_z$
$a_{12} = -(L_F eK_F - L_R K_R)/I_z$
$a_{21} = -(L_F eK_F - L_R K_R)/M$
$a_{22} = -(eK_F + K_R)/M$
$b_{11} = L_F eK_F/I_z$
$b_{12} = -L_R K_R/I_z$
$b_{21} = eK_F/M$
$b_{22} = K_R/M$

TABLE 2

$$y = CX = [1 \quad 0]X = \dot{\phi} \quad (6)$$

$$A_P(s)\dot{\phi} = B_F(s)\theta_S + B_R(s)\delta_R \quad (7)$$

Wherein, $$A_P(s) = s^2 - (a_{11} + a_{22})(2/V)s + (a_{11}a_{22} - a_{12}a_{21})(2/V)^2 + 2a_{12} = s^2 - a_{y1}(2/V)s + a_{y01}(2/V)^2 + a_{y02};$$

$$B_F(s) = b_{11}(2/N)s + (-a_{22}b_{11} + a_{12}b_{21})(4/VN) = b_{F1}(2/N)s + b_{F0}(4/VN);$$

and $$B_R(s) = 2b_{12}s + (-a_{22}b_{12} + a_{12}b_{22})(4/V) = b_{R1}s + b_{R0}(4/V);$$

$$F(s) = s^2 + (f_0 + g_0)s + f_0 g_0 \quad (8)$$

$$\frac{A_P(s)}{F(s)}\dot{\phi} = \frac{B_F(s)}{F(s)}\theta_S + \frac{B_R(s)}{F(s)}\delta_R \quad (9)$$

$$\dot{\phi} - \frac{(f_0 + g_0)s + f_0 g_0}{F(s)}\dot{\phi} = \frac{1}{F(s)}\{a_{y1}(2/V)s - a_{y01}(2/V)^2 - a_{y02}\}\dot{\phi} + \quad (10)$$

$$\frac{1}{F(s)}\{b_{F1}(2/N)s + b_{F0}(4/VN)\}\theta_S + \frac{1}{F(s)}\{b_{R1}s + b_{R0}(4/V)\}\delta_R$$

TABLE 3

$$\eta = \theta^T \xi \quad (11)$$

Wherein, $$\eta = \dot{\phi} - \{(f_0 + g_0)sF(s)^{-1} + f_0 g_0 F(s)^{-1}\}\dot{\phi};$$

$$\theta^T = [a_{y1} a_{y01} a_{y02} b_{F1} b_{F0} b_{R1} b_{R0}];$$

and $$\xi = [(2/V)sF(s)^{-1}\dot{\phi}, -(2/V)^2 F(s)^{-1}\dot{\phi}, -F(s)^{-1}\dot{\phi}, (2/N)sF(s)^{-1}\theta_S, (4/VN)F(s)^{-1}\theta_S, sF(s)^{-1}\theta_S, (4/V)F(s)^{-1}\delta_R]$$

$$\eta = \hat{\theta}^T \xi \quad (12)$$

Wherein, $$\hat{\theta}^T = [\hat{a}_{y1} \hat{a}_{y01} \hat{a}_{y02} \hat{b}_{F1} \hat{b}_{F0} \hat{b}_{R1} \hat{b}_{R0}]$$

$$\eta(k) = \theta(k)^T \xi(k) \quad (13)$$

$$\hat{\eta}(k) = \hat{\theta}(k)^T \xi(k) \quad (14)$$

$$\hat{\theta}(k+1) = \hat{\theta}(k) + \frac{\beta(k)\Gamma(k)\xi(k)\varepsilon(k)}{\sigma + \xi(k)^T \Gamma(k)\xi(k)} \quad (15)$$

$$\Gamma(k+1) = \Gamma(k) - \frac{\beta(k)\Gamma(k)\xi(k)\xi(k)^T \Gamma(k)}{1 + \xi(k)^T \Gamma(k)\xi(k)} \quad (16)$$

$$\varepsilon(k) = \eta(k) - \hat{\theta}(k)^T \xi(k) \quad (17)$$

Wherein, $$\Gamma(0) = \Gamma(0)^2 > 0, \quad 0 \leq \beta(k) < 2$$

TABLE 4

$$\frac{\dot{\phi}}{\theta_S} = \frac{B_F(s)}{A_P(s)} \quad (18)$$

TABLE 4-continued $$\hat{\theta}^T = [\hat{a}_{y1}\hat{a}_{yo1}\hat{a}_{yo2}\hat{b}_{F1}\hat{b}_{F0}] \tag{19}$$

$$\frac{\dot{\phi}}{\theta_S} = \frac{B_F(s)}{A_P(s)} = \frac{b_{F1}(2/N)_s + b_{F0}(4/VN)}{s^2 - a_{y1}(2/V)_s + a_{yo1}(2/V)^2 + a_{yo2}} \tag{20}$$

$$\left(\frac{\dot{\phi}}{\theta_S}\right) = \frac{b_{F0}(4/VN)}{a_{yo1}(2/V)^2 + a_{yo2}} = Y_G \tag{21}$$

$$C_{F(orR)max} = \sqrt{\{(g_{max} \cdot \mu_H \cdot M_{F(orR)} - f^2 T_y) \cdot (v^2)_y\}} \tag{21}$$

TABLE 5

$$I_{zM} \cdot dd\phi_M(t) = 2 \cdot L_{FM} \cdot C_{FM} - 2 \cdot L_{RM} \cdot C_{RM} \tag{22}$$

$$M_M \cdot dv_{yM} = 2 \cdot L_{FM} \cdot C_{FM} - 2 \cdot L_{RM} \cdot C_{RM} \tag{23}$$

$$C_{FM} = eK_{FM} \cdot \left(\frac{\theta}{N_M} - \frac{v_{yM} + L_{FM} \cdot d\phi_M}{v}\right) \tag{24}$$

$$C_{RM} = K_{RM} \cdot \left(-\frac{v_{yM} - L_{RM} \cdot d\phi_M}{v}\right) \tag{25}$$

$$dv_{yS} = \frac{2 \cdot (C_{FS} + C_{RS})}{M_S} - v \cdot d\phi_M \tag{26}$$

$$C_{FS} = HeK_{FS} \cdot \left(\frac{\theta}{N_S} - \frac{v_{yS} + L_{FS} \cdot d\phi_M}{v}\right) \tag{27}$$

$$C_{RS} = \frac{I_{zS} \cdot dd\phi_M - 2 \cdot L_{FS} \cdot C_{FS}}{2 \cdot L_{RS}} \tag{28}$$

$$\beta_{RS} = \frac{C_{RS}}{HK_R} \tag{29}$$

$$\delta_{RC} = \beta_{RS} + \frac{v_{yS} - L_{RS} \cdot d\phi_M}{v} \tag{30}$$

What is claimed is:

1. A vehicular dynamic controlling apparatus comprising:
   a vehicular velocity sensor to detect a vehicular velocity;
   a steering angular displacement sensor to detect a steering angular displacement of a vehicular steering wheel;
   a yaw rate sensor to detect a vehicular yaw rate;
   a yaw rate gain estimating section that estimates a vehicular yaw rate gain from detected values of the vehicular velocity, the yaw rate, and the steering angular displacement;
   a target yaw rate gain setting section that sets a target value of the yaw rate gain;
   a brake force distribution controlling section that calculates a brake force command value for each of vehicular front left and right and rear left and right tire wheels to reduce a deviation between an estimated value of the yaw rate gain and the target value thereof;
   a brake pressure controlling section that controls a brake pressure to be applied to each tire wheel in accordance with the brake force command value for each tire wheel;
   a tire information calculating section that calculates a tire information related to a vehicular dynamic information on the basis of the brake force command value for each tire wheel individually and previously measured tire data;
   a rear tire wheel steering actuator to be enabled to actuate the rear tire wheels to be steered;
   a target vehicular dynamical variable calculating section that calculates target vehicular dynamical variables on the basis of the detected values of the vehicular velocity and the steering angular displacement and a target vehicular dynamic model;
   a rear tire wheel steering angular displacement command value calculating section that calculates a rear tire wheel steering angular displacement command value according to the detected values of the vehicular velocity and the steering angular displacement, the target vehicular dynamical variables, the tire information, and a previously measured controlled vehicular dynamic model; and
   a rear tire wheel steering angular displacement controlling section that controls an actuation of the rear tire wheel steering angular displacement actuator to make the rear tire wheel steering angular displacement command value coincident with an actual rear tire wheel steering angular displacement.

2. A vehicular dynamic controlling apparatus as claimed in claim 1, wherein the target vehicular dynamical variable calculating section further includes:
   a determinator to determine a plurality of coefficients on the target vehicular dynamical variables on the basis of the estimated value of the yaw rate gain and the tire information and wherein the target vehicular dynamical variable calculating section calculates the target dynamical variables in accordance with the detected values of the vehicular velocity and steering angular displacement and the target vehicular dynamic model on which the determined coefficients are reflected.

3. A vehicular dynamic controlling apparatus as claimed in claim 1, further comprising:
   a road surface frictional coefficient estimator to estimate a frictional coefficient of a road surface on which the vehicle is running and wherein the tire information calculating section calculates the tire information related to the vehicular dynamic information on the basis of an estimated value of the road surface frictional coefficient, the respective braking forces applied to the respectively corresponding tire wheels, and the previously measured tire data.

4. A vehicular dynamic controlling apparatus as claimed in claim 1, further comprising:
   a road surface frictional coefficient estimator to estimate a frictional coefficient of a road surface on which the vehicle is running and wherein the target dynamical variable calculating section includes;
      a determinator to determine the plurality of coefficients to the target vehicular dynamical variables on the basis of detected value of the road surface frictional coefficient, an estimated value of the yaw rate gain, and the tire information; and
   wherein the target vehicular dynamical variable calculating section calculates the target vehicular dynamical variables on the basis of the target vehicular dynamic model on which the determined coefficients are reflected and the detected values of the vehicular velocity and the steering angular displacement.

5. A vehicular dynamic controlling apparatus as claimed in claim 1, further comprising:
   a road surface frictional coefficient estimator to estimate a frictional coefficient of a road surface on which the vehicle is running; and wherein the tire information calculating section includes a tire maximum cornering force calculator to calculate a maximum cornering force of each tire wheel using a predetermined circle of friction equation in accordance with an estimated value of the road surface frictional coefficient, the brake force applied to each tire wheel, and a maximum acceleration at a detected value of the road surface frictional coefficient.

6. A vehicular dynamic controlling apparatus as claimed in claim 1, further comprising:
a road surface frictional coefficient estimator to estimate a frictional coefficient of a road surface on which the vehicle is running; and
wherein the tire information calculating section includes a tire maximum cornering force calculator to calculate a maximum cornering force of each tire using a predetermined ellipse equation, the brake force applied to each of the tire wheels, each tire wheel load, a maximum acceleration on an estimated value of the road surface frictional coefficient, a ratio between a previously measured maximum longitudinal force and a lateral force.

7. A vehicular dynamic controlling apparatus as claimed in claim 6, wherein the yaw rate gain estimating section calculates the vehicular yaw rate gain in a steady state as follows:
$Y_G = \psi/\theta s$, wherein $\psi$ denotes the detected yaw rate and $\theta s$ denotes the detected steering angular displacement.

8. A vehicular dynamic controlling apparatus as claimed in claim 7, wherein the target yaw rate gain setting section sets the target value of the yaw rate gain in the steady state as follows: $Y_{GT} = V/\{NL(1+AV^2)\}$, wherein V denotes the detected vehicular velocity, N denotes a steering ratio of the vehicle, L denotes a wheel base, and A denotes a stability factor of the vehicle.

9. A vehicular dynamic controlling apparatus as claimed in claim 8, wherein the braking force distributing section includes:
a deviation calculator to calculate the deviation between the estimated value of the yaw rate gain in the steady state $Y_G$ and the target value of the yaw rate gain in the steady state $Y_{GT}$;
a brake command value calculator to calculate the brake command value Brkcom for each tire wheel according to the deviation as follows: Brkcom=ErrI×BrkI+ErrP×BrkP, wherein ErrI denotes an integration value of the deviation, BrkI denotes an absolute value of the deviation, ErrP denotes a deviation variable, and BrkP denotes a proportional gain; and
a brake command value outputting section that outputs the calculated brake command value Brkcom to the brake pressure controlling section to apply the brake for each rear tire wheel when Brkcom>0 and to apply the brake for each front tire wheel when Brkcom<0.

10. A vehicular dynamic controlling apparatus as claimed in claim 9, wherein the tire wheel information calculating section calculates front and rear tire maximum cornering forces $C_F$ and $C_R$ as follows: $C_F$ (or $_R$)max=$\sqrt{\{gmax \cdot \mu_H \cdot M_F \text{(or }_R) \cdot f_{Ty}^2\} \cdot \gamma^2 y\}}$, wherein gmax denotes a longitudinal acceleration which is enabled to be generated from either the rear or front tires when the detected road surface frictional coefficient, $\mu_H$ denotes an estimated road surface frictional coefficient, $M_F$ (or $_R$) denotes a wheel load of the front or rear tires, $f_{Ty}$ denotes a driving force or braking force, $\gamma y$ denotes the ratio of the maximum lateral force to the maximum longitudinal force that the corresponding tire can generate.

11. A vehicular dynamic controlling apparatus as claimed in claim 10, wherein the target vehicular dynamic variable calculating section calculates a yaw angular acceleration $dd\psi_M$ and yaw angular velocity $d\psi_M$ as the target vehicular dynamical variables as follows:

$$I_{ZM} \times dd\ \psi_M[(t)] = 2 \times L_{FM} \times C_{FM} - 2L_{RM} \times C_{RM},$$

$$M_M \times d_{vyM} = 2 \times L_{FM} \times C_{FM} - 2 \times L_{RM} \times C_{RM},$$

$$C_{FM} = e_{KFM} = e_{KFM} \times \{\theta/N_M - (V_y + L_{FM} \times d\psi_M)/v\},$$

$$C_{RM} = K_{RM} \times \{-(\psi_{yM} - L_{RM} \times d\psi_M)/v\},$$

wherein v denotes the detected value of the vehicular velocity, θ denotes the detected value of the steering angular displacement, $I_{ZM}$ denotes a yaw inertia moment of the target vehicular model, $M_M$ denotes a mass of the target vehicular model, $L_{FM}$ denotes a distance from a rear tire wheel axle of the target vehicular model to a center of gravity, $L_{RM}$ denotes a distance from a front tire wheel axle of the target vehicular model to the center of gravity, $e_K R_M$ denotes a front tire wheel equivalent cornering power of the target vehicular dynamic model, $K_{RM}$ denotes a rear tire wheel cornering power of the target vehicular dynamic model, $C_{FM}$ denotes a front tire cornering force of the target vehicular dynamic model, $C_{RM}$ denotes a rear tire cornering force of the target vehicular dynamic model, $N_M$ denotes a steering gear ratio of the target vehicular dynamic model, $d_{vyM}$ denotes a lateral acceleration of the target vehicular dynamic model $V_{yM}$ denotes a lateral velocity of the target vehicular dynamic model.

12. A vehicular dynamic controlling apparatus as claimed in claim 11, wherein the rear tire wheel steering angular displacement command value calculating section calculates the rear tire wheel angular displacement command value $\delta_{RC}$ from the target yaw angular acceleration and velocity $dd\psi_M$ and $d\psi_M$, the detected values of the steering angular displacement θ and the vehicular velocity v, and the previously measured controlled vehicular dynamic model as follows:

$$\delta_{RC} = \beta_{RS} + (v_{ys} - L_{RS} \cdot d\psi_M)/v,$$

wherein $\beta_{RS} = C_{RS}/H_{KR}$ and $C_{RS} = (I_{ZS} \cdot dd\psi_M - 2 \cdot L_{FS} \cdot C_{FS})/2 \cdot L_{RS}$, wherein $C_{FS} = HeK_{FS}\{\theta/N_S - (v_{ys} + L_{FS} \cdot d\psi_M)/v\}$ and $dv_{ys} = 2(C_{FS} + C_{RS})/M_S - vd\psi_M$, and wherein $I_{ZS}$ denotes a yaw inertia moment of the controlled vehicular dynamic model, $M_S$ denotes a mass of the controlled vehicular dynamic model, $L_{FS}$ denotes a distance from a front tire wheel axle of the controlled vehicular dynamic model to a center of gravity, $L_{RS}$ denotes a distance from a rear tire wheel axle of the controlled vehicular dynamic model to the center of gravity thereof, $HeK_{FS}$ denotes an estimated value of an equivalent front tire wheel cornering power of the controlled vehicular dynamic model, $H_{KR}$ denotes an estimated value of an equivalent rear tire wheel cornering power of the controlled vehicular dynamic model, $C_{FS}$ denotes a front tire wheel cornering force of the controlled vehicular dynamic, $C_{RS}$ denotes a rear tire wheel cornering force of the controlled vehicular dynamic model, $N_S$ denotes a steering gear ratio of the controlled vehicular dynamic model, $dv_{YS}$ denotes a lateral acceleration of the controlled vehicular dynamic model, and $v_{YS}$ denotes a lateral velocity of the controlled vehicular dynamic model.

13. A vehicular dynamic controlling apparatus as claimed in claim 12, wherein a limiter is provided in the rear tire wheel steering angular displacement command value calculating section for each of the cornering forces $C_{FS}$ and $C_{RS}$ as follows:

If $C_{FS} < C_{FMAX}$, $C_{FS} = C_{FS}$, if $C_{FS} \geq C_{FMAX}$, $C_{RS} < C_{RMAX}$, $C_{RS} = C_{RS}$, and if $C_{RS} \geq C_{RMAX}$, $C_{RS} = C_{RMAX}$.

14. A vehicular dynamic controlling apparatus comprising:

vehicular velocity sensing means for detecting a vehicular velocity;

steering angular displacement sensing means for detecting a steering angular displacement of a vehicular steering wheel;

yaw rate sensing means for detecting a vehicular yaw rate;

yaw rate gain estimating means for estimating a vehicular yaw rate gain from detected values of the vehicular velocity, the yaw rate, and the steering angular displacement;

target yaw rate gain setting means for setting a target value of the yaw rate gain;

brake force distribution controlling means for calculating a brake force command value for each of vehicular front left and right and rear left and right tire wheels to reduce a deviation between an estimated value of the yaw rate gain and the target value thereof;

brake pressure controlling means for controlling a brake pressure to be applied to each of the tire wheels in accordance with the brake force command value for each tire wheel;

tire information calculating means for calculating a tire information related to a vehicular dynamic information on the basis of the brake force command value for each tire wheel individually and previously measured tire data;

rear tire wheel steering actuating means for actuating the rear tire wheels to be steered;

target vehicular dynamical variable calculating means for calculating target vehicular dynamical variables on the basis of the detected values of the vehicular velocity and the steering angular displacement and a target vehicular dynamic model;

rear tire wheel steering angular displacement command value calculating means for calculating a rear tire wheel steering angular displacement command value according to the detected values of the vehicular velocity and the steering angular displacement, the target vehicular dynamical variables, the tire information, and a previously measured controlled vehicular dynamic model; and rear tire wheel steering angular displacement controlling means for controlling an actuation of the rear tire wheel steering angular displacement actuator to make the rear tire wheel steering angular displacement command value coincident with an actual rear tire wheel steering angular displacement.

15. A vehicular dynamic controlling method comprising:

detecting a vehicular velocity;

detecting a steering angular displacement of a vehicular steering wheel;

detecting a vehicular yaw rate;

estimating a vehicular yaw rate gain from detected values of the vehicular velocity, the yaw rate, and the steering angular displacement;

setting a target value of the yaw rate gain;

calculating a brake force command value for each of vehicular front left and right and rear left and right tire wheels to reduce a deviation between an estimated value of the yaw rate gain and the target value thereof;

controlling a brake pressure to be applied to each of the tire wheels in accordance with the brake force command value for each tire wheel;

calculating a tire information related to a vehicular dynamic information on the basis of the brake force command value for each tire wheel individually and previously measured tire data;

calculating target vehicular dynamical variables on the basis of the detected values of the vehicular velocity and the steering angular displacement and a target vehicular dynamic model;

calculating a rear tire wheel steering angular displacement command value according to the detected values of the vehicular velocity and the steering angular displacement, the target vehicular dynamical variables, the tire information, and a previously measured controlled vehicular dynamic model; and controlling an actuation of a rear tire wheel steering angular displacement actuator to make the rear tire wheel steering angular displacement command value coincident with an actual rear tire wheel steering angular displacement.

16. A vehicular dynamic controlling apparatus comprising:

a vehicular velocity sensor to detect a vehicular velocity;

a steering angular displacement sensor to detect a steering angular displacement of a vehicular steering wheel;

a yaw rate sensor to detect a vehicular yaw rate;

a yaw rate gain estimating section that estimates a vehicular yaw rate gain from detected values of the vehicular velocity, the yaw rate, and the steering angular displacement;

a target yaw rate gain setting section that sets a target value of the yaw rate gain;

a brake force distribution controlling section that calculates a brake force command value for each of vehicular front left and right and rear left and right tire wheels to reduce a deviation between an estimated value of the yaw rate gain and the target value thereof;

a brake pressure controlling section that controls a brake pressure to be applied to each tire wheel in accordance with the brake force command value for each tire wheel;

a tire information calculating section that calculates a tire information related to a vehicular dynamic information on the basis of the brake force command value for each tire wheel individually and previously measured tire data;

a rear tire wheel steering actuator to be enabled to actuate the rear tire wheels to be steered;

a target vehicular dynamic variable calculating section that calculates target vehicular dynamical variables on the basis of the detected values of the vehicular velocity and the steering angular displacement and a target vehicular dynamic model;

a rear tire wheel steering angular displacement command value calculating section that calculates a rear tire wheel steering angular displacement command value according to the detected values of the vehicular velocity and the steering angular displacement, the target vehicular dynamical variables, the tire information, and a previously measured controlled vehicular dynamic model, and wherein said rear tire wheel steering angular displacement command value is affected by the brake force for each tire wheel; and a rear tire wheel steering angular displacement controlling section that controls an actuation of the rear tire wheel steering angular displacement command value coincident with an actual rear tire wheel steering angular displacement.

* * * * *